United States Patent [19]

Nguyen Thuy

[11] Patent Number: 5,684,803
[45] Date of Patent: Nov. 4, 1997

[54] COMMUNICATION SYSTEM FOR ELECTRONIC EQUIPMENT INCLUDING DISTRIBUTED PROCESSORS

[75] Inventor: Nam Nguyen Thuy, Antony, France

[73] Assignee: U.S. Philips Corporation, New York, N.Y.

[21] Appl. No.: 370,991

[22] Filed: Jan. 10, 1995

[30] Foreign Application Priority Data

Jan. 12, 1994 [FR] France ............................ 94 00266

[51] Int. Cl.$^6$ ........................................ H04J 12/28
[52] U.S. Cl. ............................. 370/451; 370/458
[58] Field of Search ............... 370/85.11, 85.09, 370/85.7, 85.8, 85.1, 85.2, 85.3, 100.1, 105.1, 110.1, 68.1, 60, 94.1, 60.1, 94.3, 211, 445, 447–455, 457, 458, 461, 459, 462, 507, 508–512, 514, 517, 520, 385; 340/825.08; 375/242, 362, 355, 356, 359

[56] References Cited

U.S. PATENT DOCUMENTS 5,379,290  1/1995  Kleijne .................... 370/853

FOREIGN PATENT DOCUMENTS 0192305   8/1986   European Pat. Off. .
0519350  12/1992   European Pat. Off. .

OTHER PUBLICATIONS

"Teleinformatique Transport et Traitement de l'Information Dans les Reseaux et Systemes Teleinformatiques" C. Macchi et al, pp. 206–218.
Search Report.

*Primary Examiner*—Dang Ton
*Attorney, Agent, or Firm*—David R. Treacy

[57] ABSTRACT

A communication system interconnecting n slave processors (P1, P2, ..., Pn) and a master processor (Pn+1) includes a first data communication bus, a second serial signalling bus, which acts as a conduit for a synchronous signalling frame, which consists of time intervals (IT) assigned to the processors, and circuitry for synchronizing the time intervals in the processors. In addition, n first comparing circuits, each associated with one of the slave processors, are provided for detecting the cyclic appearance of the IT assigned thereto. A second comparing circuit associated with the master processor indicates the cyclic appearance of a respective IT.

14 Claims, 1 Drawing Sheet

COMMUNICATION SYSTEM FOR ELECTRONIC EQUIPMENT INCLUDING DISTRIBUTED PROCESSORS

The present invention relates to a communication system between n+1 processors, of which one is a master processor and n are slaved processors, using a first data communication bus.

Contemporary electronic equipment includes a large number of microprocessor-based cards. The microprocessors (hereinafter processors) of each respective card communicate with one another by a communication bus for the sake of management such as:

the monitoring and use of the cards of the equipment,
the communication to the exterior of information about the internal use of the equipment.

In general, one of the processors of the specialized equipment is used as a bridging element between the internal information of the equipment and the external control unit which unit may be either a local or a remote unit. Therefore, the special processor performing the master function is qualified as the "master processor", while the other processors are called slave processors".

The general problem posed by this type of communication bus is that of the right of priority of the various processors, it being understood that each processor is capable of transmitting information in a random fashion, whereas the single bus is capable of passing only one message at a time, which manifests in the notion of collision avoidance. Moreover, in the case of access simultaneity to the communication bus (or near-simultaneity in practice), one may wish to establish a hierarchy between processors for the purpose of setting access priority, which complicates the general problem mentioned above still more by slightly modifying the right of access by the chronological order of the requests.

If one wishes to have data transmission units such as equipment or transceivers forming a local network communicate with each other by transferring pieces of information, for example, in a geographically restricted area, one frequently uses a network configuration consisting of an asynchronous serial bus with a single transmission link to which are connected in parallel the pieces of equipment distributed along the bus. Such a local network which operates in the broadcasting mode is known, for example, under the name of ETHERNET manufactured by the American XEROX CORPORATION. It is a particular bus, but other examples of this type of bus are the VME bus or Token Ring. The importance of these specific buses is that they allow of random access; their major drawback is that they are costly and cumbersome on the cards of the equipment.

Other buses such as serial buses of the V11/V24 or HDLC type, or parallel buses have the advantage of being less costly than the specific buses, but they have the drawbacks. The primary drawback is that there is a single communication bus for all the cards and the access to the bus must be managed in one of the following manners to avoid messages being held back:

the master processor interrogates each of the slave processors successively (polling), such as the SEM protocol of French telecom,
each processor has a limited and fixed access time with respect to a synchronization. P In these cases it is difficult to access the bus at random.

SUMMARY OF THE INVENTION

It is an object of the invention to provide communication support between processors of an electronic unit, which communication support is both economic and fast, so that nearly random access is permitted which can be compared with the presence of a master processor.

According to the invention this object is achieved and the prior-art drawbacks are removed due to the fact that the communication system set out in the opening paragraph as comprising a first data communication bus is characterized in that the communication system further comprises, on the one hand, a second serial signalling bus from each slave processor to the master processor as well as signalling means for applying to the second signalling bus a synchronous signalling frame formed by m adjacent time intervals of which n time intervals are assigned, more specifically, to n slave processors and, on the other hand, at least two clock channels, of which a first channel is provided for transmitting the basic clock of the signalling frame of a clock generator from the master processor to the slave processors, first comparing means for identifying in each slave processor the appearance of a serial number of the time interval assigned to the respective slave processor, and second comparing means in the master processor for assigning the time intervals of the respective n slave processors in each signalling frame.

The communication bus support thus obtained may be qualified as pseudorandom. It is not a matter of random access per se in the way since there is no immediate access of a slave processor to the data bus even if the latter is free, whereas it is like the ETHERNET system, for example, if in that system, the previous automatic listening interval of the processor to be certain that its message containing a request for access is not disturbed or neglected. However, the request for access can be acceded to very quickly, i.e., within about a frame period, which can be on the order of several hundredths of a second.

Moreover, an advantageous embodiment of the invention with respect to reducing the price and the awkwardness of the communication support technique is characterized in that for the link of this communication system to the processors these processors comprise frame insertion means for feeding frames to the signalling bus at least in a transmit mode for the n slave processors and at least in a receive mode for the master processor.

Preferably, the first comparing means in each slave processor comprise a first pulse counter which mark the beginning of the time intervals on a clock channel with each signalling frame, and a comparator connected to the first pulse counter, which indicates a serial number specifically assigned to the respective slave processor.

A preferred embodiment of the invention is characterized in that the second comparing means in the master processor comprise a second pulse counter which mark the beginning of the time intervals within each signalling frame, which indicates the serial number assigned to each slave processor.

Another preferred embodiment of the invention is characterized in that the second comparing means, being software, comprise a first transmit section in each slave processor for transmitting its address during the time interval of the signalling frame assigned thereto, and a second receive section in the master processor for recognizing this address.

Typically, the data transmission bus used for the invention is designed for transmitting management data which leads at limited information rates of less than 1 Gbaud. Under these circumstances, it is advantageous to use a first serial bus, for example, a multi-point HDLC bus for transmitting the data. In effect, this allows of the management of a set of rather remote processors, that is to say, located at several meters or dozens of meters apart, which is contrary to a parallel bus which, while passing much higher rates, would be subject to a phase shift between signals on the various conductors and thus be limited to being used in closely-located electronic equipment.

A particularly preferred embodiment for the communication system according to the invention which combines the required main advantages such as the signalling rate, the simplicity of implantation in the processors and the possibility of moving the latter away from each other is characterized in that it is arranged for interconnecting processors of the type MC 68302 manufactured by MOTOROLA while the data transmission bus is a HDLC bus.

BRIEF DESCRIPTION OF THE DRAWINGS

The following description referring to the appended drawings will make it better understood how the invention can be realized, while the whole is given as a non-limiting example. The drawings show.

DETAILED DESCRIPTION OF THE PREFERRED EMBODIMENTS

Figure 1:
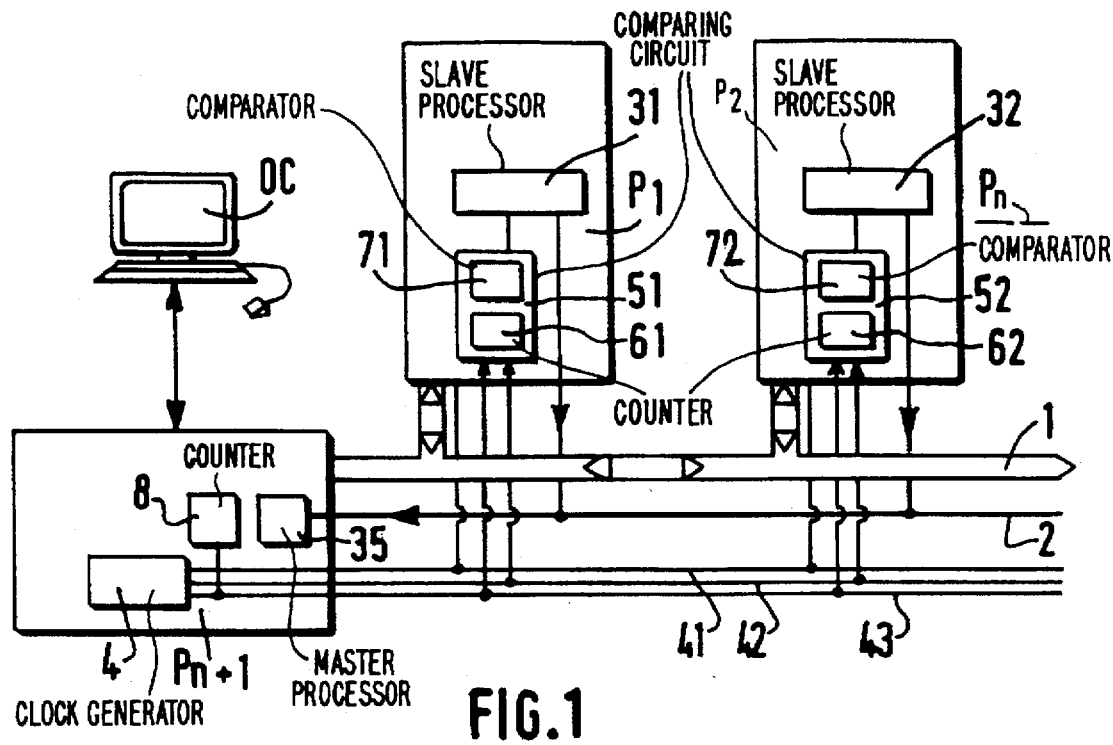
in FIG. 1, a set of processors which utilize a communication support according to the invention.

From the n+1 processors P1, P2, ..., Pn, Pn+1 arranged as a network in FIG. 1, n (where n is an integer greater than 1) are the slave processors and one of them, denoted Pn+1, is a master processor. The master processor is arranged, on the one hand, for receiving and centralizing the internal management data of the electronic equipment to which the n+1 processors belong and, on the other hand, for exchanging this information with a control unit OC such as a workstation, for example, while this control unit may be located close to or remote from the electronic equipment. The n+1 processors communicate with each other by a two-way transmission bus 1. The electronic equipment may be particularly a network of which the management is hereinafter standardized by the CCITT. This may also relate to a radio network for which, at each radio location, a microprocessor (which becomes identified with one of the processors P1, P2, ..., Pn) is in charge of controlling the use of the equipment. Another example is that of Asynchronous Transfer Mode (ATM) equipment formed by a cabinet in a telecommunication exchange or at the user's location, which contains various cards each of which performs a specific process of the ATM mode and each of which comprises a processor (microprocessor in this case) for controlling the card. All of these processors communicate with each other by an operating bus which forms part of the bus 1 shown in FIG. 1, which may be either a parallel bus or a serial bus for permitting remote processors to be included in the network. The bus 1 is a multi-point bus between all the processors of the equipment, that is to say, that each processor can transmit or receive whatever message on this bus, typically a management data message. It will be understood that various processors can receive the same message at the same time. In contrast, one single processor at the time can transmit. If a serial bus is concerned, the bus 1 is preferably a High-level Data Link Control (HDLC) bus. For more information on this type of bus, one be referred to the publication: "Téléinformatique, transport et traitement de l'information dans les réseaux et systems téléinformatiques" by César Macchi et al., 1979, published by Dunod, pp. 206 to 218. The format of a standardized HDLC frame is the following:

TABLE 1

| 8 bits | 16 bits | 8 bits | 8 N bits | 16 bits | 8 bits |
| --- | --- | --- | --- | --- | --- |
| flag beginning | address | control | message information (optional) | CRC | flag end |

The destination processor is activated in response to the identification of the address in the message. To avoid messages colliding on bus 1, at any moment there is never more than one processor authorized to transmit. According to the invention like, for that matter, in other communication systems where there is a master processor, the assignment for slave processors to transmit is centralized by the master processor. In practice, this means that an arbitrary processor that wishes to transmit on bus 1 first has to request an assignment of this bus from the master processor. According to the invention, the request for assignment of a transmission slot on bus 1 is made by a second, specific, signalling bus 2.

Bus 2, in addition to the main function of assigning bus 1 access, is also used for supplying further information to the master processor, which information does not necessarily imply return information.

Preferably, the signalling bus 2 is a one-way bus having a direction from the slave processors to the master processor. In FIG. 1, the bus 2 is shown in the form of a one-way conductor. Each slave processor n has a right to transmit in a time interval which is typically one octet long, but which may also be several octets long, as required, either for all the processors or only for certain ones of them. The time intervals belong to a synchronous frame whose duration, in proportion to the number n of cards to be managed, can be short, i.e., on the order of several hundredths of a second. The signalling bus 2, thus, makes fast signalling possible despite its low information rate. The information it transports makes it possible to inform the master processor, more specifically, about the presence of the card (carrier card of a slave processor), request for transmission on bus 1, alarm signal . . .

It will be noted that the place of each time interval relative to the beginning of the frame depends on the physical address of each processor.

For utilizing the signalling frame, it is necessary for the cards of the electronic equipment to comprise frame insertion means, which makes additional material necessary and renders the whole electronic system cumbersome and costly. For this reason, it is particularly advantageous for the processors P1, P2, ..., Pn, Pn+1 to comprise frame insertion means on bus 2, at least in the transmit mode for the n slave processors and at least in the receive mode for the master processor. The processors of FIG. 1 are of this type and comprise such means, referenced 31, 32, for transmission from the slave processors and 35 for reception in the master processor. For this reason, preference should be given to the use of processors such as the MOTOROLA-type MC 68302, which has 3 multi-mode input/output ports which are identical and which allow frame insertion in both the transmit and receive modes.

Each processor can be capable of recognizing the time interval assigned thereto in the frame (that is 1 interval in m, with m>n). Therefore, a synchronization is necessary, which is realized by means of various clock wires. Preferably, each slave processor comprises a first comparing circuit acting as means for identifying the cyclic appearance of a serial number of the time interval. The clock wires are connected, on the one hand, to a clock generator 4, which is advantageously integrated into the master processor and, on the other hand, to the proper inputs of each slave processor. FIG. 1 illustrates a first clock wire 41 which supplies the basic clock, a second frame synchronization wire 42 and a third frame time interval synchronization wire 43.

Figure 2:
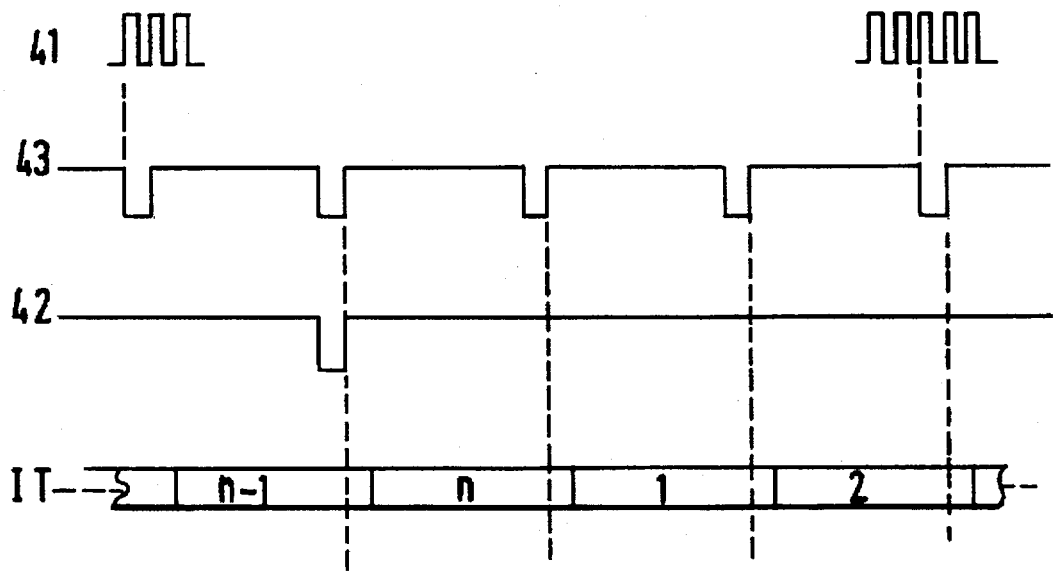
in FIG. 2, a timing diagram of the clock signals used for implementing the invention, as well as the signalling frame; and in FIG. 3, organization of the signalling frame of which the synchronization is indicated in FIG. 2.

The synchronization is exemplified in FIG. 2 in the form of clock signals on wires 41, 42, 43. It is supposed that the time intervals were equal and each are represented by the length of an octet.

By means of these clock signals, it is possible to actuate the first comparing means such as 51, 52 (FIG. 1), which each consist of a first counter such as 61, 62, pulses on the conductor 43 in each frame, and a comparator such as 71, 72 connected to the corresponding counter. Each comparator thus indicates in the frame, a specific serial number assigned to the processor which the comparator belongs to. If in that instant, the processor has information to be transmitted to the master processor, it puts the information in the bit locations reserved therefor in its specific time interval. If the possible information consists of four signals at most, 2 bit locations will suffice. If the signals are larger in number, a larger number of bit locations in the time interval can be assigned thereto and, as required, this time interval is to be expanded by 1 or several octets for one or more slave processors or for all the slave processors. The time intervals IT are represented in FIG. 2 in the form of octets and the indication of their serial number shows how the synchronization is effected, with a shift (phase shift) of a little over 1 octet (so as not to render the drawing too complicated, it is supposed that the n adjacent time intervals occupy the whole frame which, however, is not imperative).

Each information transmitted by a slave processor on bus 2 is to be received by the master processor Pn+1 thanks to the frame insertion means at the receiving end 35 preferably allows simultaneous identification of the origin of the information. To achieve this, two embodiments of said second comparing means are described immediately below.

A first embodiment of the hardware type consists of connecting the means 35 to a counter 8, a second counter, inside the Processor Pn+1 which counts the pulses that mark the beginning of the time intervals for each signalling frame. In other words, the pulses on the conductor 43 are counted. At any moment, in a manner not shown, but well within grasp of a person of ordinary skill in the art, correspondence is established in the master processor between the received information (possibly received information) at 35 and the serial number indicated by the counter 8 of the slave processor authorized to transmit at this moment, which produces the desired identification.

If one wishes to break away from the constraint which consists of systematically counting the octets in the master processor, another embodiment, which is more of a software nature than the preceding embodiment, can be implemented. According to this second embodiment, each slave processor writes again its address in the time interval of the information octet, which requires several more bit locations in the time interval as compared with the number of bits required for the first embodiment. This implies address transmitting means associated with the processors P1, P2, . . . , Pn, and address receiving means associated with the processor Pn+1, which means are not shown because they advantageously can form an integral part of the n+1 processors themselves.

Figure 3:
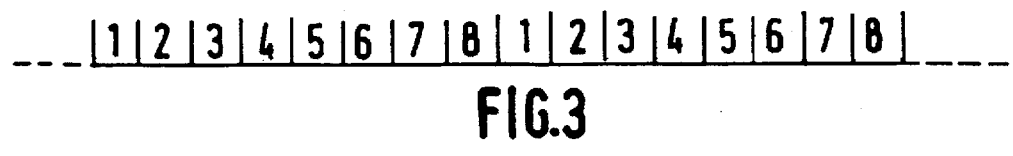

FIG. 3 shows two octets of the signalling frame in one or two time intervals. In one time interval, a first bit location is reserved for indicating whether the information that follows in the interval is valid (logic "1" state) or not valid (logic "0" state). The 7 (15) next bit locations are reserved for the actual information. For the first embodiment (relating to the second comparing means) these 7 bit locations are used for transmitting the command, that is to say, the signalling information, which is largely sufficient, and, thus, all the time intervals can be reduced to 1 octet (byte). For the second mode, on the other hand, 5 or 6 bit locations may be necessary for transmitting the address. The portion of the field that remains for the command if only one byte were allowed may turn out to be too short and, therefore, the time intervals are enlarged to 2 octets (bytes).

The signalling information from the slave to the master may imply a return message in reverse direction as this is the case for a request for access to the data transmission bus 1. In that case, the master processor, which permanently monitors the state of occupation of bus 1, sends an authorization to transmit to the requesting one of the slave processors, while taking into consideration, as required, a hierarchy between requesting slave processors with respect to requests which are close together in time. This authorization can be in the form of the address of the slave processor concerned, which informs that slave processor in the information field defined in Table 1 above that an authorization has been obtained to transmit in the frame on bus 1. With a HDLC bus, only the destination processor is informed, which advantageously avoids useless information processing in the other processors.

As a variant, the master processor may also have a time interval at its disposal in the signalling frame, which expands the latter to n+1 useful time intervals. In the latter case, bus 2 becomes a two-way bus and the frame insertion means in all the processors are arranged for both transmission and reception. It will be appreciated that this is made possible, for example, by the use of MOTOROLA MC 68302 type microprocessors. It thus becomes possible to transfer the authorization for transmission from the master to the slave, always by transmitting the address of the slave processor by the signalling bus itself. In this variant, the master processor can comprise units (not shown) analogous to those units such as 31 and 51 (FIG. 1) of the slave processors.

EMBODIMENT

One exemplary embodiment of a fast communication support circuitry according to the invention includes 20 electronic cards, each comprising a microprocessor of the MOTOROLA MC 68302 type. The 20 microprocessors of which one is a master processor and nineteen are slave processors, are interconnected by a multi-point data HDLC bus and a signalling bus 2 consisting of a single wire. Three clock wires further interconnect a clock generator in the master processor or an associated card, where necessary, and each of the slave processors. Each processor has 3 multi-mode input/output ports and the connections from the bus to the microprocessors are effected as follows for each slave processor:

1 of the 3 ports, programmed in the HDLC mode, is connected to the HDLC bus;

another port, programmed in the 8-bit Pulse Code Modulation (PCM) mode, which is one of the defined access modes of MOTOROLA MC 68302), is connected to the signalling bus; and for the master processor:

1 of the 3 ports, programmed in the HDLC mode, is connected to the HDLC bus another port, programmed in the mode called "sync-prior 8 bits data reception", is connected to the signalling bus.

The signalling bus is a one-way bus in the direction from the slave microprocessors to the master microprocessor. Each slave processor has a right to transmit in a time interval of the two octets in a synchronous frame on this bus of which one octet is intended for the address of the microprocessor and the other octet is intended for the information to be transmitted to the master microprocessor. A rate of 9.6 kbit/s allows for a 40 ms signalling sync frame, which may be considered very fast as regards the maximum time required for applying the information concerning a special event to the master processor in the electronic equipment managed by the 20 processors.

It will be noted that the synchronization of the time intervals of processors could be performed using only two clock wires. It is, in effect, possible to realize the frame synchronization and time interval synchronization in the frame with a single wire which would replace the wires 42 and 43. However, this renders the decoding of the clock pulses received in the processors more complicated.

It is also possible to utilize a bus other than the HDLC bus for data transmission. However, in so far as this bus is arranged for transmitting management data, the HDLC bus, which is a serial bus but which at the same time permits rates of 1 Gbaud, is sufficient, there being given that the rates to be provided typically remain lower than 0.5 Gbaud and even often below 256 Mbauds. For that matter, the fact that it is a serial bus affords the advantage of being suitable for widely spaced processors, if necessary, especially for electronic radio equipment.

What is claimed is:

1. A communication system connecting n+1 processors one of which is a master processor and n of which are slave processors, said system comprising:

a first data communication bus;

a second serial signalling bus connecting each of the n slave processors to the one master processor;

signalling means for applying to the second serial signalling bus a synchronous signalling frame formed of m adjacent time intervals of which n time intervals are assigned to respective ones of the n slave processors;

a clock generator associated with the one master processor;

a first channel transmitting first pulses as a basic clock of said signalling frame from said clock generator to the n slave processors;

first comparing means in each of the n slave processors for identifying the appearance of a serial number of one of said time intervals assigned to a respective one of the n slave processors; and second comparing means associated with the one master processor for identifying any of said time intervals assigned to the n slave processors in each said signalling frame, where n and m are integers and m>n.

2. The communication system as recited in claim 1, wherein said n+1 processors collectively further comprise frame insertion means for providing said signalling frame to the signalling bus at least when the n slave processors are in a transmit mode of operation and when the one master processor is in a receive mode of operation.

3. The communication system as recited in claim 1, further comprising:

a second frame synchronization channel conducting second pulses indicative of a beginning of said signaling frame; and a third time interval synchronization channel conducting third pulses indicative of a beginning of each of said time intervals.

4. The communication system as recited in claim 1, wherein said first comparing means in each the n slave processors comprises:

a first pulse counter counting second pulses which mark a beginning of said time intervals on a clock channel associated with said signalling frame; and a comparator connected to said first pulse counter indicating a serial number specifically assigned to a respective one of the n slave processors.

5. The communication system as recited in claim 4, wherein said second comparing means in the one master processor comprises:

a second pulse counter counting third pulses which mark a beginning of said time intervals associated with said signalling frame, which indicates the serial number assigned to each respective one of the n slave processors.

6. The communication system as recited in claim 4, wherein said second comparing means, being software, comprise:

a transmit section in each of the n slave processors for transmitting its respective address during the time interval of said signalling frame assigned thereto; and a receive section in the one master processor for recognizing this address.

7. The communication system as recited in claim 4, wherein said second comparing means comprise:

means in each of the n slave processors for transmitting its respective address during the time interval of said signalling frame assigned thereto; and means in the one master processor for recognizing this address.

8. The communication system as recited in claim 1, wherein said first data communication bus is a serial bus.

9. The communication system as recited in claim 8, wherein said first data communication bus is a high-level data link control (HDLC) bus.

10. The communication system as recited in claim 9, wherein each of the n+1 processors includes 3 multi-mode input/output ports interconnected as follows:

(a) for each of the n slave processors:
        (i) 1 of the 3 ports, programmed in the HDLC mode, is connected to the HDLC bus;
        (ii) another port, programmed in a 8-bit pulse code modulation (PCM) mode is connected to said second serial signalling bus; and (b) for the one master processor:
        (i) 1 of the 3 ports, programmed in the HDLC mode, is connected to the HDLC bus; and
        (ii) another port, programmed in a sync-prior 8 bits data reception mode, is connected to said second serial signalling bus.

11. The communication system as recited in claim 10, wherein each of said n+1 processors is an MC 68302 processor manufactured by MOTOROLA.

12. The communication system as recited in claim 10, wherein each of the n+1 processors includes 3 multi-mode input/output ports interconnected as follows:

(a) for each of the n slave processors:

(i) 1 of the 3 ports is connected to the HDLC bus;

(ii) another port is connected to said second serial signalling bus; and (b) for the one master processor:

(i) 1 of the 3 ports is connected to the HDLC bus; and (ii) another port is connected to said second serial signalling bus.

13. The communication system as recited in claim 11, wherein each of said n+1 processors is an MC 68302 processor manufactured by MOTOROLA.

14. A system for communication between n+1 processors including one master processor and n slave processors, where n is an integer greater than 1, said system comprising:

a data communication bus;

a two-way serial signalling bus operatively connected to all of the n+1 processors;

signalling means for applying to the two-way serial signalling bus a signalling frame comprising m adjacent time intervals, where m>n, among which n+1 time intervals are assigned, respectively, to the n+1 processors; and synchronization means for synchronizing n+1 time intervals associated with the n+1 processors;

first comparing means in each of the n processors for identifying the appearance of a serial number of said time interval assigned thereto; and second comparing means in the one master processor for identifying within said signalling frame the respective time intervals assigned to the n+1 processors.

* * * * *